(12) United States Patent
Salzer et al.

(10) Patent No.: US 6,234,269 B1
(45) Date of Patent: May 22, 2001

(54) OPERATING ELEMENT FOR A PROXIMITY RELATING DEVICE FOR VEHICLES

(75) Inventors: Volker Salzer, Althengstett; Michael Dimitrov, Muehlacker, both of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/337,514

(22) Filed: Jun. 22, 1999

(30) Foreign Application Priority Data

Jul. 22, 1998 (DE) .............................. 198 32 870

(51) Int. Cl.$^7$ .................................. B60K 26/00
(52) U.S. Cl. .................. 180/333; 180/170; 74/484 R
(58) Field of Search .................. 180/333, 334, 180/170; 74/484 R, 523; 200/61.85

(56) References Cited

U.S. PATENT DOCUMENTS

| | | | |
|---|---|---|---|
| 3,988,574 | * 10/1976 | Peitsmeier | 180/333 |
| 4,030,088 | * 6/1977 | McCullough | 340/267 C |
| 4,348,556 | * 9/1982 | Gettig et al. | 200/5 R |
| 4,454,785 | * 6/1984 | Purrer | 74/523 |
| 4,640,997 | * 2/1987 | Lane, Jr. | 200/61.54 |
| 4,723,057 | * 2/1988 | Lane, Jr. | 200/61.27 |
| 5,014,200 | * 5/1991 | Chundrlik et al. | 364/426.04 |
| 5,230,400 | * 7/1993 | Kakinami et al. | 180/169 |
| 5,234,071 | * 8/1993 | Kajiwara | 180/169 |
| 5,695,020 | * 12/1997 | Nishimura | 180/169 |
| 5,809,841 | * 9/1998 | Smith | 74/531 |
| 5,839,534 | * 11/1998 | Chakraborty et al. | 180/169 |
| 6,081,763 | * 6/2000 | Smith et al. | 701/93 |

FOREIGN PATENT DOCUMENTS

| | | |
|---|---|---|
| 2049849 | 4/1972 | (DE) . |
| 374047 | * 6/1995 | (EP) . |
| 813988 A2 | * 12/1997 | (EP) . |

\* cited by examiner

*Primary Examiner*—Brian L. Johnson
*Assistant Examiner*—Daniel Yeagley
(74) *Attorney, Agent, or Firm*—Evenson, McKeown, Edwards & Lenahan, P.L.L.C.

(57) ABSTRACT

An operating element is provided for a proximity regulating device for vehicles with an actuating lever. The operating element actuating lever has a rotatably mounted head that can assume a plurality of radial switch positions. If the head is in its initial switch position, the proximity regulating device sets an initial distance from a leading vehicle. As the result of the rotary movement from this initial switch position, one or more additional radial switch positions can be set for a near distance in which the proximity regulating device sets a set distance from a leading vehicle that is shorter than the initial distance. Finally, one or more radial switch positions are provided in which the proximity regulating device sets a far distance that is greater than the initial distance.

34 Claims, 3 Drawing Sheets

OPERATING ELEMENT FOR A PROXIMITY RELATING DEVICE FOR VEHICLES

BACKGROUND AND SUMMARY OF THE INVENTION

This application claims the priority of German application 198 32 870.2, filed in Germany on Jul. 22, 1998.

The invention relates to an operating element for a proximity regulating device for vehicle.

A control stalk is known from German Patent Document No. DE-OS 20 49 849 whose head is rotatably mounted, with the head being able to assume a plurality of radial switch positions. In addition, an axially movable switch knob for triggering additional switch functions is provided endwise on the head.

By contrast with this prior art, a goal of the invention is to provide an operating element for a proximity regulating device for vehicles.

This goal is achieved according to preferred embodiments of the invention by providing an operating element for a proximity regulating device for vehicles, comprising an actuating lever that has a rotatably mounted head, said head being movable from a first specified radial switch position in which the proximity regulating device sets an initial distance from a leading vehicle, to a second radial switch position for a near distance in which the proximity regulating device sets a distance from a leading vehicle that is shorter than the initial distance, and to a third radial switch position for a far distance in which the proximity regulating device sets a distance from a leading vehicle that is increased relative to the initial distance.

It is proposed according to preferred embodiments of the invention to provide the operating element with an actuating lever that has a rotatably mounted head which can assume a plurality of radial switch positions. When the head is in its initial switch position, a proximity regulating device sets an initial distance from a leading vehicle. By a rotary movement from this initial switch position, one or more additional radial switch positions can be set for a distance in which the proximity regulating device sets a required distance from a leading vehicle that is reduced from the initial distance. Finally, one or more radial switch positions are provided in which the proximity regulating device sets a far distance that is increased relative to the initial distance. The operating element provided for a proximity regulating device is especially simple to operate since the driver, by simply turning the head from an initial position, can adjust various distances from a leading vehicle starting at a starting position.

Advantageous features and improvements of preferred embodiments of the invention are described herein and in the claims.

It is proposed according to certain preferred embodiments that the head be latched in a first radial switch position for the near distance and in a further first radial switch position for the far distance, and that the proximity regulating device in these radial switch positions set a previously stored set distance. Thus, a distance is clearly associated with each first radial switch position and a distance can be selected in an especially safe manner.

Alternatively or in addition, second radial switch positions can be provided for influencing a specified distance. In these two switch positions, the head is not latched but returns to its initial position following actuation. According to a first alternative, the change in the previously stored set distance is continuous and takes place depending on the residence time in the radial switch position. According to a second alternative, the influence takes place in stages, preferably between 10 percent and 30 percent. Each selection corresponds to a change by one step. If the initial distance is to be changed, the head must be moved from the position for the initial distance into one of the radial switch positions to influence it; the influence then takes place in the manner described previously. The distance value newly determined in this manner by the driver is stored as the new setpoint for the near distance or the far distance and can be called up again at any time by selecting one of the corresponding radial switch positions. The set or newly stored values for the near distance or the far distance can be changed by the radial switch positions for influence. For this purpose, the radial switch position is initially selected whose distance value is to be changed. Starting at this switch position, the value stored for this radial switch position is changed by selecting one of the radial switch positions for influence in the manner described above and a newly set value is then stored. With this design of the radial switch positions, the distance value associated with the latching radial switch positions can be adjusted or influenced at any time without the advantageous clarity of operation being lost.

It is also proposed, according to certain preferred embodiments, to reset the values influenced or changed in the manner described above for the near distance or the far distance to fixed initial values when leaving a standby position of the proximity regulating device. Alternatively, resetting takes place when the vehicle is parked, therefore typically when the ignition of the vehicle is switched off or the ignition key is removed. In this case, the influenced or changed values are retained even when leaving the standby position of the proximity regulating system. It is also proposed to design the head so that it can be actuated by outside force and brought into a specified radial switch position, preferably into the radial switch position for the initial distance. This is preferably accomplished under the same requirements as described above for resetting. However, it is not necessary that the same conditions be used for resetting a newly set distance and resetting the head to the specified radial switch position. By resetting the head to the specified radial switch position, assurance is provided that the driver, upon returning to the standby position of the proximity regulating system, but at the latest when re-starting the vehicle, is not surprised by previously made settings, but the proximity regulating system always sets the original distance. In addition to the conditions specified above, the head can be reset to the specified switch position even if the proximity regulating device is in its standby position, but is not activated.

To design such an operating element, it is proposed that for resetting to the specified radial switch position, a latch for the head be capable of being disengaged when actuated by outside force and that the head be held, centered by springs, in the specified radial switch position. An operating element of this kind for example can be designed as a control stalk that carries the head on a support shaft. In addition to the radial switch position provided for operating the proximity regulating device, a control stalk of this kind can assume switch positions by pivoting that can be used in a manner known of itself for operating a speed regulating system.

Regarding the arrangement of the radial switch positions for the near distance or the far distance, it is proposed to locate the operating element in an essentially horizontal position and to assign the radial switch position that can be reached by a rotary movement in correspondence with the rotary movement of the wheels of the vehicle to the near distance. The radial switch position that can be reached by a rotary movement opposite the rotary movement of the wheels of the vehicle is associated with the far distance.

Other objects, advantages and novel features of the present invention will become apparent from the following detailed description of the invention when considered in conjunction with the accompanying drawings.

DETAILED DESCRIPTION OF THE DRAWINGS

Figure 1:
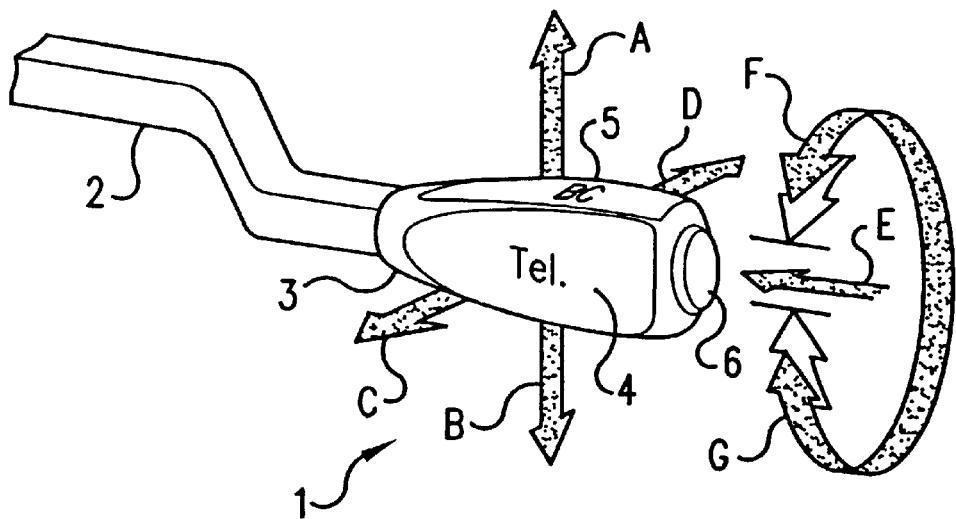
FIG. 1 is a perspective schematic view of a control stalk constructed according to preferred embodiments of the present invention.

FIG. 1 shows a control stalk 1 consisting of a support shaft 2 and a head 3. In the present case, head 3 is pivotably connected with support shaft 2 around the lengthwise axis of support shaft 2 so that movements F and G are possible. Support shaft 2 is held pivotably in a manner not shown in greater detail and permits movements A to D. The pivoting movements A and B correspond to upward and downward movements of control stalk 1, movements C and D correspond to forward and backward movements, each relative to a driver, not shown. A button 6 located endwise on head 3 is actuated in a movement direction E.

Markings 4, 5 are located on head 3, with the markings facing the driver (marking 4 in the example shown) indicating to the driver which radial switch position head 3 is currently assuming. To apply markings 4, 5, the latter can be provided on caps not shown in greater detail that clip into head 3. This makes it possible to adapt the markings to the equipment of a vehicle provided with control stalk 1.

Figure 2:
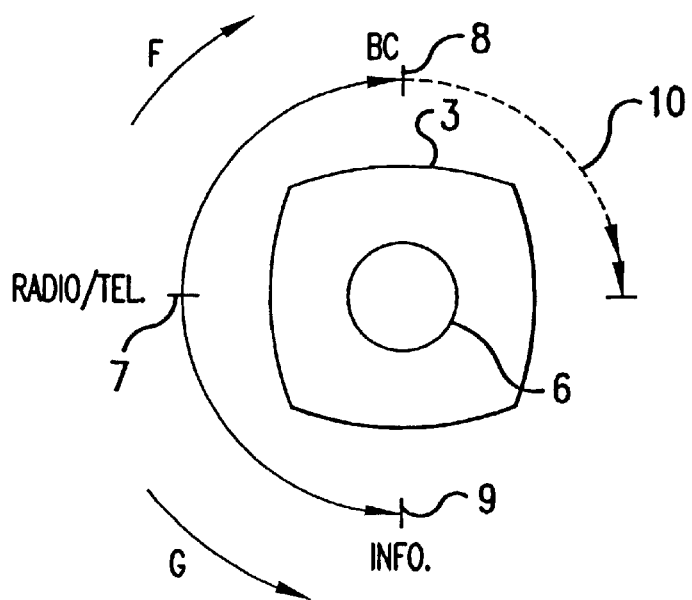
FIG. 2 is a schematic view depicting specified radial switch positions of the control stalk of FIG. 1 according to a first application.

As shown in greater detail in FIG. 2, the operation of the control stalk is associated with the various switch positions of head 3. Thus, in switch position 7 a telephone 21 and a radio 25 (see FIG. 5), in switch position 8 an on-board computer 23, and in switch position 9 an information system 22 can be operated, with operation in each case taking place by movements A through E. Head 3 engages each of switch positions 7 to 9. In addition, it is of course possible to assign the switch position represented by the dashed line 10 in FIG. 2 with an additional device, not shown.

Figure 3:
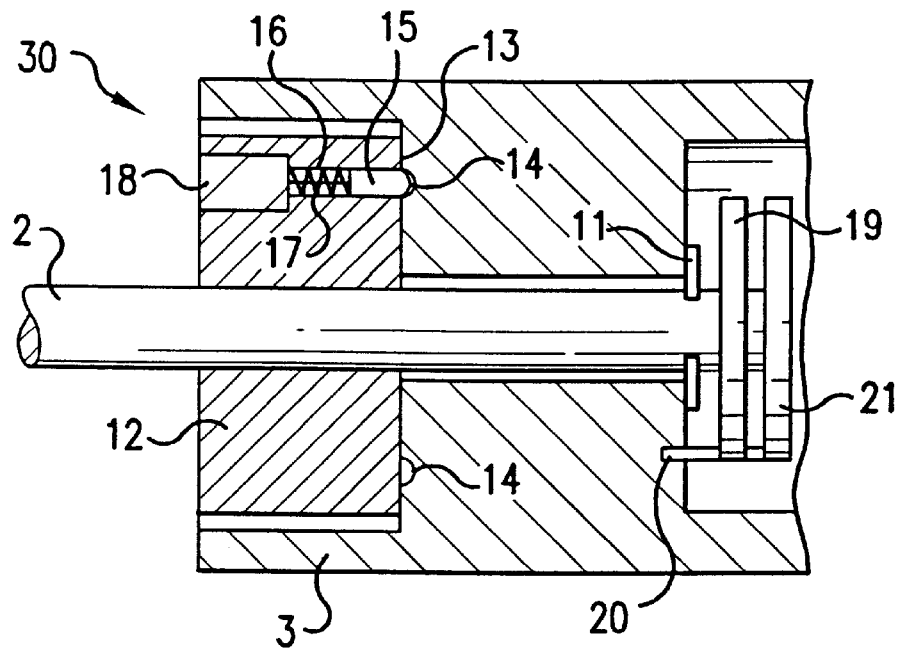
FIG. 3 is a sectional view through a latching mechanism of the control stalk of FIG. 1.
Figure 4:
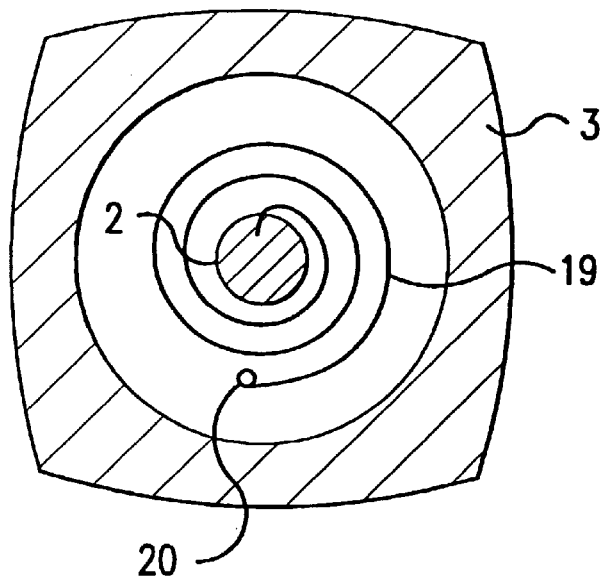
FIG. 4 is a sectional view showing the latching mechanism of the control stalk of FIGS. 1–3.

A latching device used to latch head 3 is shown in greater detail in FIGS. 3 and 4. Head 3 is rotatably mounted on support shaft 2 and secured in the axial direction by a safety disk 11. The second axial bearing for head 3 is formed by a block 12 permanently attached to support shaft 2. Depressions 14 are machined in head 3 in a contact plane 13 between block 12 and head 3, said depressions corresponding to switch positions 7 to 9. A latching pin 15 is provided in a block 12 and corresponds to depressions 14, said pin being urged by a spring 16. At the same time, latching pin 15 is connected by a tie rod 17 to magnet 18. When magnet 18 is energized, latching pin 15 is pulled out against the force of spring 16 from depressions 14 by tie rod 17.

A rotary spring 19 located behind safety disk 11 is nonrotatably mounted on support shaft 2 and engages head 3 by a pin 20. A second rotary spring 21 is likewise nonrotatably mounted on support shaft 2 and likewise engages pin 20. With latching device 30 released, in other words with head 3 freely rotatable, rotary springs 19, 21 assume a position in which the spring forces directed sequentially in opposite directions are eliminated. Springs 19, 21 are adjusted so that this position corresponds to switch position 7 of the head 3.

In other words, energization of electromagnet 18 has the result that head 3 is moved into a specified position, in this case switch position 7, by the force of rotary springs 19, 21. Of course it is also contemplated to use other means for returning head 3 to the specified switch position 7 instead of rotary springs 19, 21, for example head 3 can also be moved by an electric motor.

Figure 5:
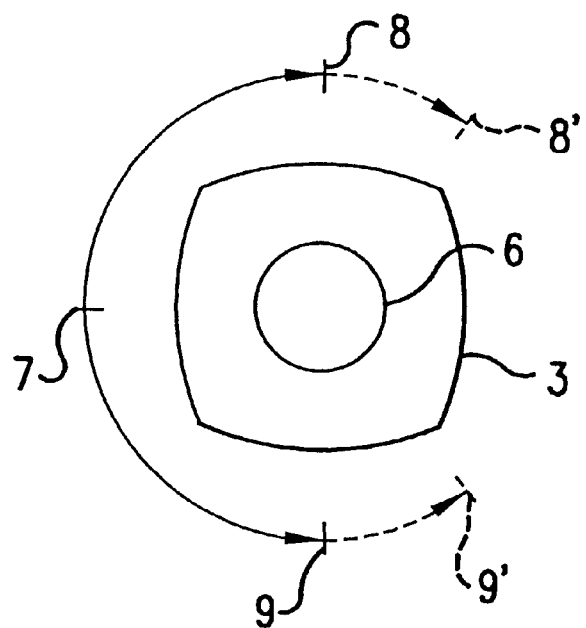
FIG. 5 is a schematic view depicting specified radial switch positions of the control stalk in conjunction with a proximity-regulated cruise-control system, according to certain preferred embodiments of the present invention.
Figure 6:
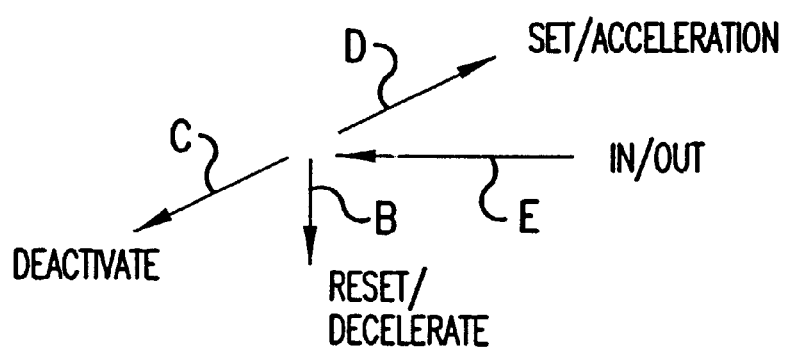
FIG. 6 is a schematic depiction of an operating diagram for preferred embodiments of the present invention.

FIGS. 5 and 6 show a use in connection with a proximity-regulated cruise-control system as an additional sample application of control stalk 1. In a proximity-controlled cruise-control system, a device is basically involved for automatic regulation of a vehicle to a speed specified by the driver. The term "proximity regulated" in this connection means that in addition to the speed, the distance from a vehicle traveling ahead in the same lane is taken into account. For this purpose, the distance from the leading vehicle is determined. If this distance thus determined falls below a specified, preferably speed-dependent value, instead of speed regulation, distance regulation takes place so that the driver's own vehicle follows the leading vehicle at the distance specified by the system. Instead of distance regulation, speed regulation cuts in again when the previously set speed is reached. A control stalk 1 used to operate such a proximity-regulated cruise-control system can be provided in addition to another control stalk 1 with which various devices on the vehicle can be operated as described in the first embodiment.

FIG. 5 shows switch positions 7 to 9 as well as 8' and 9' for a control stalk 1 used in this fashion. In switch position 7, the cruise-control system connected with the control stalk 1 is shown in its basic state, in other words an initial distance from the leading vehicle has been set. This initial distance preferably corresponds to the legally prescribed minimum distance. When the head is turned to switch position 8, the driver can set a near distance that is reduced from the initial distance. On the other hand, he can set a far distance using switch position 9 that is significantly greater than the initial distance.

Additional switch positions 8' and 9' can be selected from switch positions 8 to 9, in which positions however head 3 does not latch. In other words, to select switch positions 8' and 9', the head normally must be held by the driver; if the driver releases head 3, the head returns to switch position 8 or 9. It is also possible to provide only switch positions 8' and 9' in which head 3 normally does not latch; head 3 then returns to switch position 7 for actuation.

In switch position 8', the distance from the leading vehicle can be reduced continuously, in other words as long as head 3 is held in switch position 8', the distance from the leading vehicle is reduced continuously at a low rate of change. By releasing head 3 and allowing it to subsequently return to switch position 8, the distance reduced in this fashion is maintained. Starting with switch position 8, the distance can be further reduced by then selecting switch position 8'. In similar fashion, the distance from the leading vehicle can be increased continuously in switch position 9'.

Alternatively, the distance from the leading vehicle is reduced in stages in switch position 8', for example in the range from 10 percent to 80 percent of the distance. With each selection of switch position 8', the distance from the leading vehicle is reduced by one step. Even after head 3 has returned to switch position 8, the near distance reduced in this fashion is maintained. By selecting switch position 8' again, the distance can be reduced by one additional step. Similarly, the distance from the leading vehicle can be increased in stages in switch position 9'.

If switch position 8' is selected from switch position 7, without the head remaining in switch position 8, reduction of the distance begins starting with the initial distance and not with the near distance.

The newly set reduced distance obtained by selecting switch position 8' is stored as the new near distance for switch position 8. The same applies to the newly set increased distance obtained by selecting switch position 9'.

The switch positions B to D shown in the operating diagram according to FIG. 6 serve in a manner known of itself for setting the set speed. In switch position D, the current speed is set as the set speed and the cruise-control system is thus activated. With the cruise-control system already activated, the vehicle is accelerated slowly as long as the control stalk 1 is held in switch position D. Alternatively, each time switch position D is selected, the set speed is increased by a specified amount in the range from 10 percent to 30 percent. Switch position C serves to deactivate (delete) the cruise-control system; the currently set speed is stored temporarily. By selecting switch position D, following deactivation of the cruise-control system, the cruise-control system can be re-activated, with the previously stored set speed being used as the set speed. If the cruise-control system has already been activated, the vehicle can be decelerated by selecting switch position B for as long as switch position B is selected. Alternatively, with each selection of switch position D, the set speed can be reduced by a specified amount in the range from 10 percent to 30 percent.

With the aid of button 6 in FIG. 5, corresponding to switch position E in FIG. 6, the cruise-control system can be moved into its standby position. Switching to the standby position (pushing button 6 once) does not activate the cruise-control system; for this purpose, it is necessary instead to select switch position D as well. Regardless of the state of the cruise-control system, by pushing button 6 again, the cruise-control system is shut off completely. At the same time, magnet 18 is energized so that the head normally returns to its resting position, namely switch position 7.

When the standby position is switched off by pushing button 6, the previously stored set speed as well as all previously newly set and stored distances are deleted. This measure ensures that when the cruise-control system is switched off, permanently stored initial values are restored so that the driver is not surprised when he switches on the cruise-control system again by previously arbitrarily selected settings. Alternatively, it is possible to perform the deletion when the vehicle is parked; then the stored values are kept until the next time the vehicle is parked.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Operating element for a proximity regulating device for vehicles, comprising an actuating lever that has a rotatable mounted head, said head being movable from a first specified radial switch position in which the proximity regulating device sets an initial distance from a leading vehicle, to a second radial switch position for a near distance in which the proximity regulating device sets a distance from a leading vehicle that is shorter than the initial distance, and to a third radial switch position for a far distance in which the proximity regulating device sets a distance from a leading vehicle that is increased relative to the initial distance, wherein further second radial switch positions are provided for influencing a previously stored set distance for a reduction or an increase, wherein the previously stored set distance is changed continuously and as a function of residence time in the further switch positions, and wherein the head can be brought into the first specified radial switch position by resetting using outside force.

2. Operating element for a proximity regulating device for vehicles, comprising an actuating lever that has a rotatable mounted head, said head being movable from a first specified radial switch position in which the proximity regulating device sets an initial distance from a leading vehicle, to a second radial switch position for a near distance in which the proximity regulating device sets a distance from a leading vehicle that is shorter than the initial distance, and to a third radial switch position for a far distance in which the proximity regulating device sets a distance from a leading vehicle that is increased relative to the initial distance, wherein further second radial switch positions are provided for influencing a previously stored set distance for a reduction or an increase, wherein the previously stored set distance is changed in stages upon each selection of one of the further switch positions, and wherein the head can be brought into the first specified radial switch position by resetting using outside force.

3. Operating element for a proximity regulating device for vehicles, comprising an actuating lever that has a rotatably mounted head, said head being movable from a first specified radial switch position in which the proximity regulating device sets an initial distance from a leading vehicle, to a second radial switch position for a near distance in which the proximity regulating device sets a distance from a leading vehicle that is shorter than the initial distance, and to a third radial switch position for a far distance in which the proximity regulating device sets a distance from a leading vehicle that is increased relative to the initial distance, wherein the head latches in the second radial switch position for a near distance and in the third radial switch position for a far distance, and wherein the proximity regulating device, upon selection of these second and third radial switch positions, sets a previously stored set distance.

4. Operating element according to claim 3, wherein further second radial switch positions are provided for influencing the previously stored set distance for a reduction or an increase.

5. Operating element according to claim 4, wherein the previously stored set distance is changed continuously and as a function of residence time in the further switch positions.

6. Operating element according to claim 5, wherein the set distance is modified by influences and stored as new set distances until departing from a standby position of the proximity regulating device.

7. Operating element according to claim 5, wherein the set distances modified by influencing are stored as new set distances until it is recognized that the vehicle is not operating.

8. Operating element according to claim 4, wherein the previously stored set distance is changed in stages upon each selection of one of the further switch positions.

9. Operating element according to claim 8, wherein the set distances modified by influencing are stored as new set distances until it is recognized that the vehicle is not operating.

10. Operating element according to claim 8, wherein the set distance is modified by influences and stored as new set distances until departing from a standby position of the proximity regulating device.

11. Operating element according to claim 4, wherein the set distances modified by influencing are stored as new set distances until it is recognized that the vehicle is not operating.

12. Operating element according to claim 11, wherein head can be brought into the first specified radial switch position by resetting using outside force.

13. Operating element according to claim 4, wherein the actuating lever is located essentially horizontally and, starting at the specified first radial switch position, the second radial switch positions for a near distance can be reached by a first rotary movement in the rolling direction of the wheels of the vehicle and the third radial switch positions for a far distance can be reached by a second rotary movement opposite the rolling direction of the wheels of the vehicle.

14. Operating element according to claim 4, wherein the set distance is modified by influences and stored as new set distances until departing from a standby position of the proximity regulating device.

15. Operating element according to claim 14, wherein the resetting is performed when the proximity regulating device is deactivated.

16. Operating element according to claim 15, wherein a latching of the head in the second and third switch positions can be suspended by actuation using outside force and the head is held centered at the specified first radial switch position.

17. Operating element according to claim 4, wherein the actuating lever is a control stalk consisting of a support shaft and the head mounted on the support shaft, with at least the head being mounted rotatably on the support shaft and latched in the respective various first, second, and third radial switch positions, with additional switch positions being triggerable in each radial switch position.

18. Operating element according to claim 17, wherein the additional switch positions are provided for operating a speed regulating system.

19. Operating element according to claim 3, wherein the head can be brought into the first specified radial switch position by resetting using outside force.

20. Operating element according to claim 19, wherein the resetting is performed when it is detected that the vehicle is parked.

21. Operating element according to claim 20, wherein a latching of the head in the second and third switch positions can be suspended by actuation using outside force and the head is held centered at the specified first radial switch position.

22. Operating element according to claim 19, wherein the resetting is performed when the proximity regulating device leaves the standby position.

23. Operating element according to claim 22, wherein a latching of the head in the second and third switch positions can be suspended by actuation using outside force and the head is held centered at the specified first radial switch position.

24. Operating element according to claim 19, wherein a latching of the head in the second and third switch positions can be suspended by actuation using outside force and the head is held centered at the specified first radial switch position.

25. Operating element according to claim 19, wherein the actuating lever is a control stalk consisting of a support shaft and the head mounted on the support shaft, with at least the head being mounted rotatably on the support shaft and latched in the respective various first, second, and third radial switch positions, with additional switch positions being triggerable in each radial switch position.

26. Operating element according to claim 25, wherein the additional switch positions are provided for operating a speed regulating system.

27. Operating element according to claim 3, wherein the actuating lever is a control stalk comprising a support shaft and the head mounted on the support shaft, with at least the head being mounted rotatably on the support shaft and latched in the respective various first, second, and third radial switch positions, with additional switch positions being triggerable in each radial switch position.

28. Operating element according to claim 27, wherein the additional switch positions are provided for operating a speed regulating system.

29. Operating element according to claim 27, wherein the actuating lever is located essentially horizontally and, starting at the specified first radial switch position, the second radial switch positions for a near distance can be reached by a first rotary movement in the rolling direction of the wheels of the vehicle and the third radial switch positions for a far distance can be reached by a second rotary movement opposite the rolling direction of the wheels of the vehicle.

30. Operating element according to claim 29, wherein the additional switch positions are provided for operating a speed regulating system.

31. Operating element according to claim 3, wherein the set distance is modified by influences and stored as new set distances until departing from a standby position of the proximity regulating device.

32. Operating element according to claim 31, wherein the head can be brought into the first specified radial switch position by resetting using outside force.

33. Operating element according to claim 3, wherein the actuating lever is located essentially horizontally and, starting at the specified first radial switch position, the second radial switch positions for a near distance can be reached by a first rotary movement in the rolling direction of the wheels of the vehicle and the third radial switch positions for a far distance can be reached by a second rotary movement opposite the rolling direction of the wheels of the vehicle.

34. Operating element according to claim 4, wherein the head can be brought into the first specified radial switch position by resetting using outside force.

* * * * *